United States Patent [19]

Kittaka

[11] Patent Number: 5,050,970
[45] Date of Patent: Sep. 24, 1991

[54] LENS SYSTEM FOR USE IN OPTICAL INFORMATION DEVICE

[75] Inventor: Shigeo Kittaka, Osaka, Japan

[73] Assignee: Nippon Sheet Glass Co., Ltd., Japan

[21] Appl. No.: 285,217

[22] Filed: Dec. 16, 1988

[30] Foreign Application Priority Data

Dec. 18, 1987 [JP] Japan .............................. 62-321055
May 10, 1988 [JP] Japan .............................. 63-113296

[51] Int. Cl.$^5$ .............................................. G02B 3/00
[52] U.S. Cl. ..................................... 359/653; 359/794
[58] Field of Search ................ 350/413, 480, 414, 432

[56] References Cited

U.S. PATENT DOCUMENTS

| | | | |
|---|---|---|---|
| 4,457,590 | 7/1984 | Moore | 350/413 |
| 4,613,212 | 9/1986 | Norikazu | 350/432 |
| 4,701,032 | 10/1987 | Takada | 350/413 |
| 4,730,905 | 3/1988 | Takada | 350/480 |
| 4,758,071 | 7/1988 | Mclaughlin et al. | 350/413 |
| 4,840,467 | 6/1989 | Takada et al. | 350/413 |
| 4,880,298 | 11/1989 | Takada | 350/413 |
| 7,755,039 | 7/1988 | Hattori | 350/413 |

*Primary Examiner*—Paul M. Dzierzynski
*Attorney, Agent, or Firm*—Merchant, Gould, Smith, Edell, Welter & Schmidt

[57] ABSTRACT

A two-group two-element lens system for use in an optical information device includes a first lens adapted to be positioned closer to a light source and having a flat surface which is symmetric with respect to an optical axis thereof and a convex surface which is symmetric with respect to the optical axis, the first lens being made of a medium having a refractive index distribution along the optical axis, and a second lens adapted to be positioned closer to an image and having a spherically convex surface closer to the light source, the second lens having a positive refracting power as a whole and made of a medium having a uniform refractive index.

13 Claims, 21 Drawing Sheets

LENS SYSTEM FOR USE IN OPTICAL INFORMATION DEVICE

BACKGROUND OF THE INVENTION

1. Field of the Invention

The present invention relates to a lens system for use in an optical information device in which a laser beam is employed to record and reproduce information.

2. Description of the Relevant Art

Various optical information devices such as optical disc systems, magnetooptic systems, optical card systems, and the like employ an optical lens system comprising a number of lenses for focusing a divergent light beam emitted from a light source such as a semiconductor laser onto the recording surface of a recording medium.

Such lens systems for use in optical information devices are required to have various aberrations such as spherical aberration, coma, etc. to be properly corrected and also to be small in size and light in weight so that a lens actuator for driving the lens system has a higher level of performance for focusing and tracking In addition, it is important that lens systems be less costly to manufacture in order to make optical information devices incorporating the lens systems available relatively inexpensively in the market. Known optical lens systems include a collimator lens for rendering diverging light rays parallel and several homogeneous glass lenses for focusing the light beam onto a recording surface. For example, an optical lens system including a single aspherical lens or a single lens with a radial refractive index distribution is known as disclosed in U.S. Pat. Nos. 4,613,212, 4,457,590, and 4,701,032.

Generally, optical information processing systems require that information recording tracks or bits be closely spaced in order to record and reproduce as large an amount of information as possible. Therefore, a lens in such systems, particularly an objective lens, needs to have a diffraction limit performance. The diffraction limit performance of a lens is generally determined by the wavelength of light passing therethrough and a numerical aperture (NA) of the lens. The greater the NA of a lens, the smaller the spot of a light beam focused by the lens. It is therefore important for lenses for use in optical information recording and reproducing systems to have a large NA. If conventional optical lens systems have an NA or 0.5 or more, then the number of lenses required is increased, aberrations are difficult to correct, and strict tolerances are required.

SUMMARY OF THE INVENTION

It is an object of the present invention to provide a lens system which comprises a small number of lenses and is small in size and light in weight.

A lens system according to the present invention comprises two lenses for focusing a diverging or parallel-ray light beam emitted from a light source onto the surface of an information recording medium. The refracting power of the lens system is borne by the two lenses to achieve a high NA.

One of the two lenses which is closer to the light source comprises a planoconvex lens having one surface which is flat and symmetric with respect to the optical axis thereof and the other surface which is convex and symmetric with respect to the optical axis, the lens having an axial refractive index distribution. The lens is made of a medium having a refractive index distribution along the optical axis for well correcting aberrations. With the lens being made of such a medium with a refractive index distribution, the lens is given a degree of design freedom, i.e., a refractive index distribution, for aberration correction, as well as a curvature, a thickness, and a refractive index as with an ordinary lens.

The distribution of refractive indexes n of the lens along the optical axis may be expressed by:

$$n(Z) = n_o - kZ \tag{1}$$

where Z is a distance along the optical axis in a positive direction from an origin where the convex surface and the optical axis intersects toward the flat surface, $n_o$ is the refractive index at the vertex of the convex surface, and k is a positive constant. Then, the spherical aberration produced on the convex surface can be corrected dependent on the value of k. Since the amounts of coma, astigmatism, and other aberrations produced by the convex surface vary dependent on the value of k, the axial refractive index distribution is highly effective in correcting aberrations.

The aberrations are greatly corrected by expressing the function n(Z) as the simplest equation (1). However, the aberrations can sufficiently be corrected even if the value of n(Z) may have an error of about ±0.005 deviating from the value determined by the equation (1). According to the present invention, the function n(Z) is in the range:

$$(n_o - kZ) - 0.005 \leq n(Z) \leq (n_o - kZ) + 0.005 \tag{2}$$

The axial refractive index distribution expressed by the formula (2) may not necessarily extend across the entire thickness of the lens. Stated otherwise, the aberrations can sufficiently be corrected by expressing the range of distances Z to which the axial refractive index distribution is to be given, as $0 \leq Z \leq Z_s$, and by selecting the value of $Z_s$ in the range of:

$$0.01 \leq Z_s/Z_o \leq 1 \tag{3}$$

where $Z_o$ is the thickness of the lens on the optical axis. If the flat surface of the lens closer to the light source were convex or concave, degrees of freedom in designing the lens would be increased. However, the cost of manufacture of the lens would also be increased since it would be necessary to align the direction of the refractive index distribution with the optical axes of the surfaces of the lens when the lens is manufactured. For this reason, this surface of the lens is made flat. Inasmuch as one surface of the lens is flat, if the above ratio is outside of the range (3), the aberrations will not be largely affected irrespective of whether there is an axial refractive index distribution or not. Therefore, in the range of $Z_s \leq Z$, the refractive index may be constant or an axial refractive index distribution may be given for some reasons when producing a refractive index distribution material.

A refractive index difference along the optical axis is represented by $k.Z_s$. If the value of $k.Z_s$ were below 0.001, substantially no aberrations could be corrected, and if the value of $k.Z_s$ exceeded 0.2, it would be extremely difficult to produce a refractive index distribution material. Therefore, $k.Z_s$ should be in the range of $0.001 \leq k.Z_s \leq 0.2$, and preferably $0.01 \leq k.Z_s \leq 0.12$.

The refractive index $n_o$ at the vertex of the convex surface should preferably range from 1.50 to 1.75 in order to produce a refractive index distribution material with ease, and $n_o - k \cdot Z_s$ should preferably be 1.45 or higher.

Where the lens closer to the light source has a spherically convex surface closer to the light source and a flat surface closer to an image, the value of $Z_s$ which defines the range to which the axial refractive index distribution is to be given may be set to the value $Z_{eff}$ (FIG. 31) of Z of a point P where a light ray emitted from a point on the optical axis and passing through the outermost edge of an entrance pupil of the lens system intersects with the convex surface of the lens closer to the light source. Therefore, the range of Z in which the formula (2) is effective is as follows:

$$0 \leq Z \leq Z_{eff} \quad (4)$$

In this case, the value of the refractive index difference $k \cdot Z_{eff}$ along the optical axis is in the range of:

$$0.01 \leq k \cdot Z_{eff} \leq 0.08 \quad (5)$$

and the refractive index $n_o$ at the vertex of the convex surface is in the range of:

$$1.55 \leq n_o \leq 1.75 \quad (6)$$

It is suitable for the refractive index n(Z) in the range $Z_{eff} < Z$ to be in the range of:

$$1.45 \leq n(Z) \leq 1.80 \quad (7)$$

in view of the ease with which a refractive index distribution material or medium is produced. For the reasons described above, the refractive index may be constant in the range defined by the formula (7), or a refractive index distribution may be given in that range along the optical axis dependent on conditions in which a refractive index distribution material is produced.

The other lens of the lens system, i.e., the lens closer to the image or the image-side lens, is a lens having a positive refracting power and made from a medium which has a uniform refractive index. This lens serves to increase the refracting power of the lens system and the NA thereof. In designing the lens, a refractive index, a thickness, and the radii of curvatures of lens surfaces may be employed as degrees of freedom for correcting the aberrations. It is preferable from the standpoint of manufacturing the lens that both surfaces of the lens be spherical or flat and symmetric with respect to the optical axis. In order to well correct spherical aberration and increase the refracting power, the surface of the lens closer to the light source is made spherically convex. The surface of the lens which is closer to the image can be made spherically concave to assist in correcting spherical aberration and coma. The lens should preferably be made of general less costly and durable optical glass having a refractive index ranging from about 1.45 to 1.90, or optical plastics.

According to the present invention, the image-side lens has a refractive index n, in the range of:

$$1.45 \leq n_r \quad (8)$$

Since the image-side lens needs to have a large refracting power so as to increase the NA of the entire lens system, the condition of $0.3 = K_2/K$ should preferably be met where K is the refracting power of the entire lens system and $K_3$ is the refracting power of the image-side lens. Thus, the paraxial focal length $f_2$ (=1/$K_2$) of the image-side lens and the paraxial focal length f (=1/K) of the entire lens system should satisfy the following relationship:

$$f_2/f \leq 10/3$$

but should more preferably satisfy the following relationship:

$$f_2/f \leq 3 \quad (9)$$

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
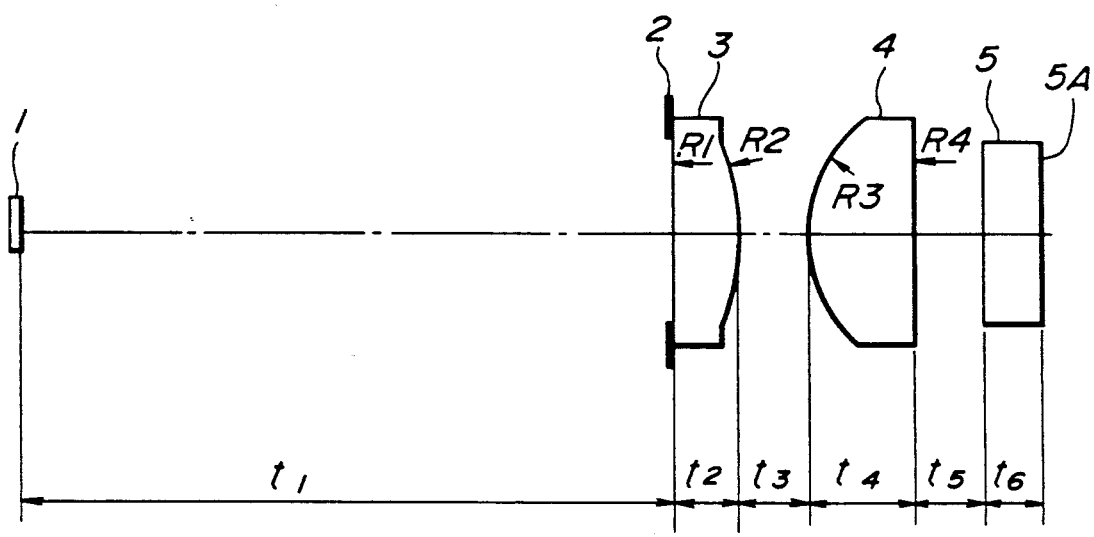
FIGS. 1, 4, 7, 10, 13, 16, 19, 22, 25, and 28 are schematic axially cross-sectional views of lens systems according to first through tenth embodiments, respectively, of the present invention.
Figure 4:
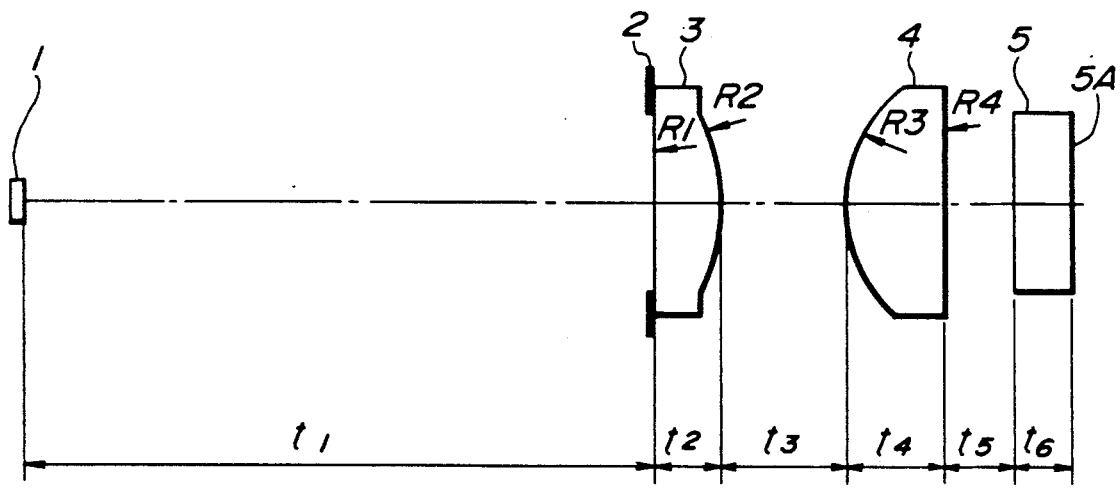
Figure 7:
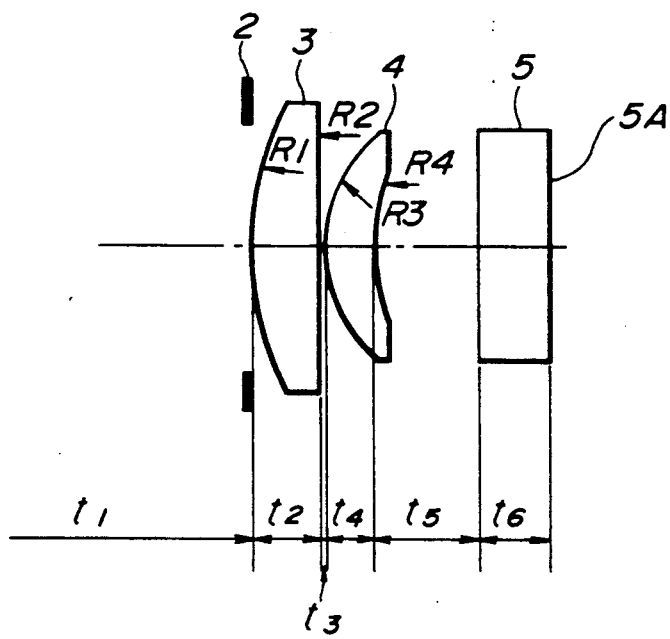
Figure 10:
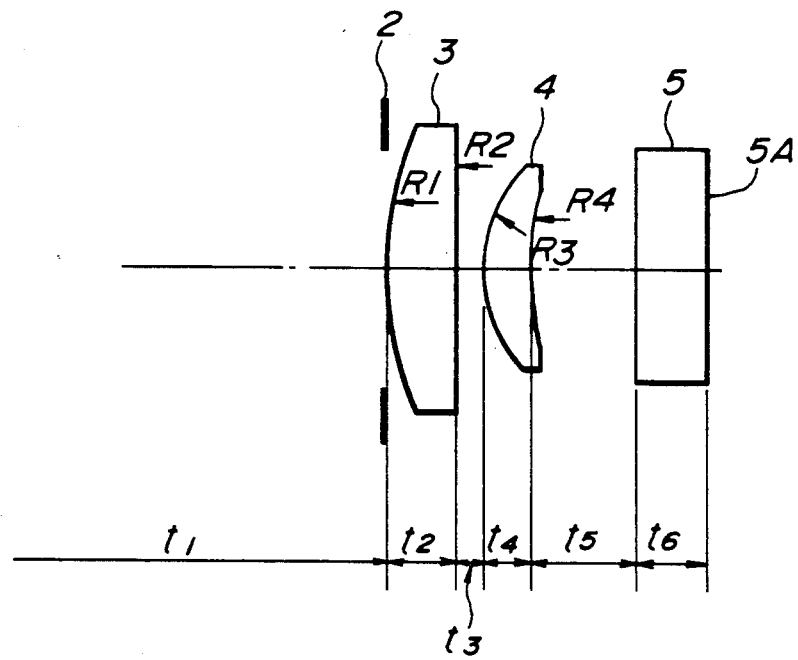
Figure 13:
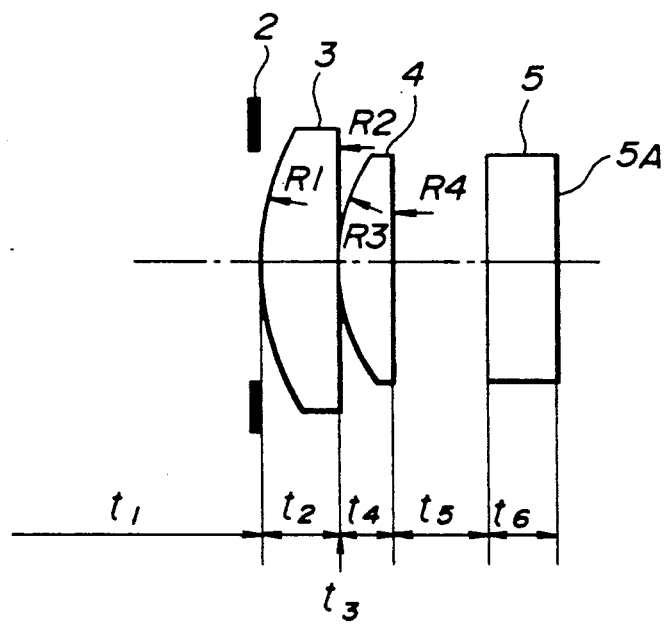
Figure 16:
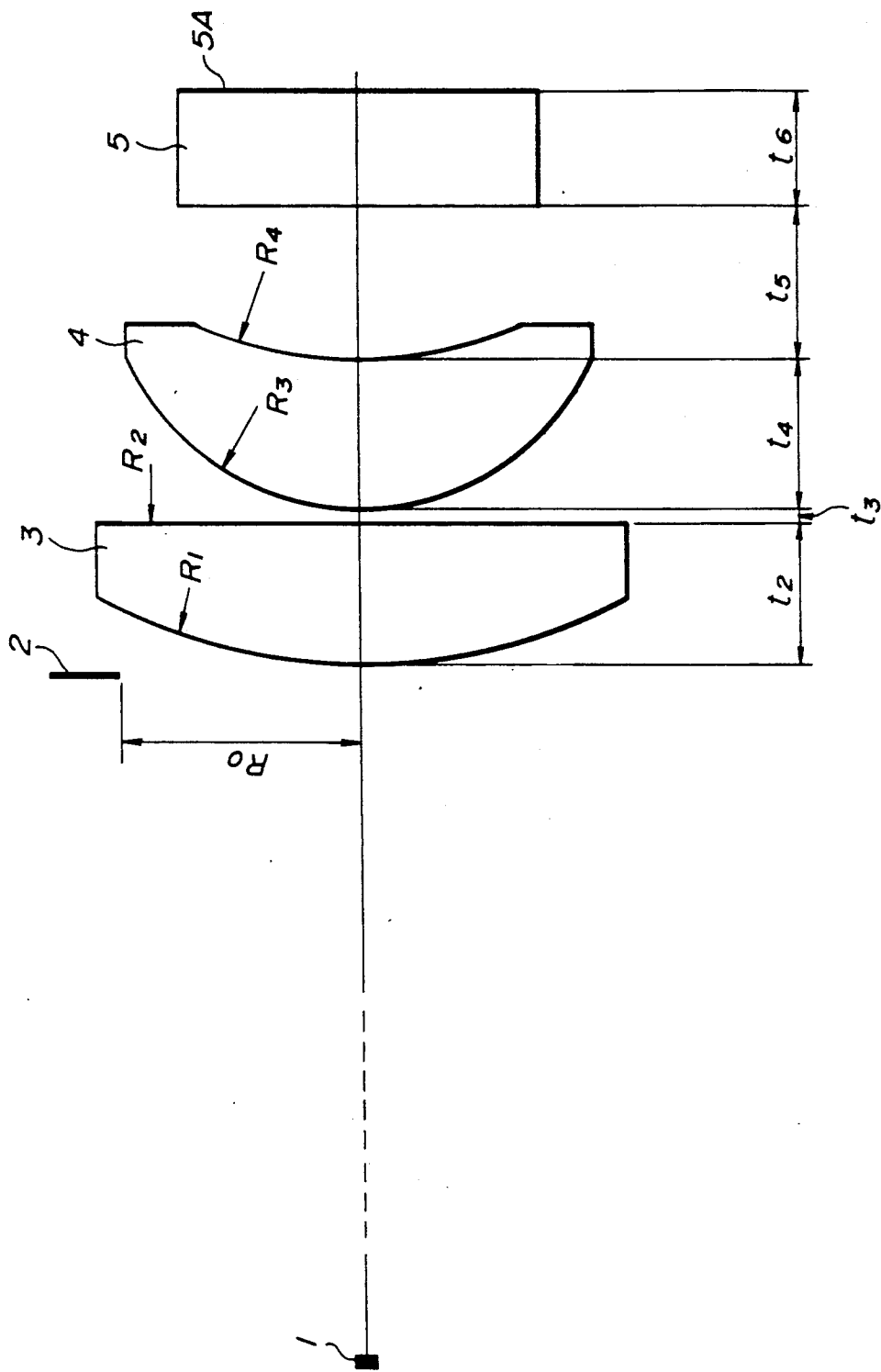
Figure 19:
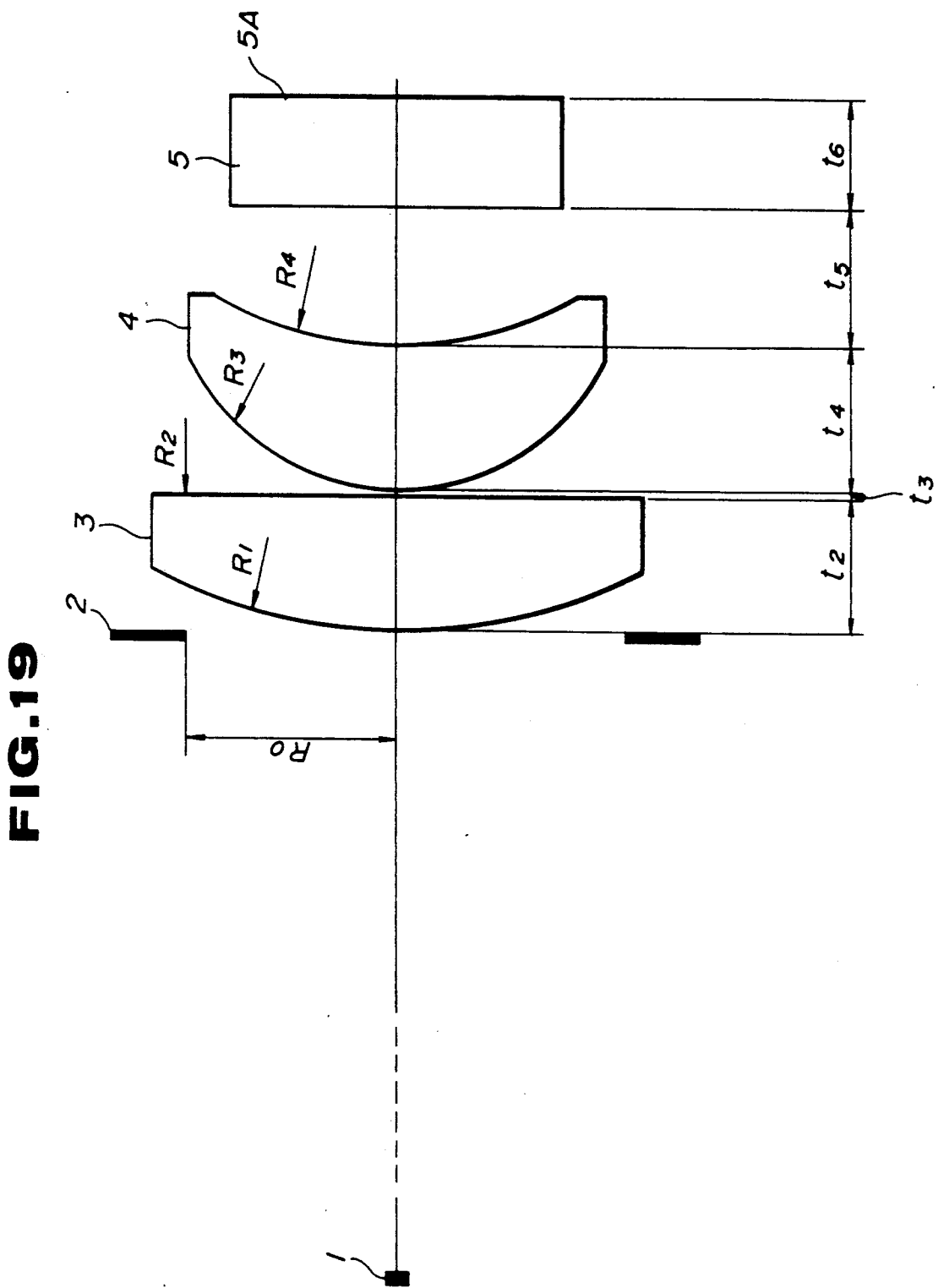
Figure 22:
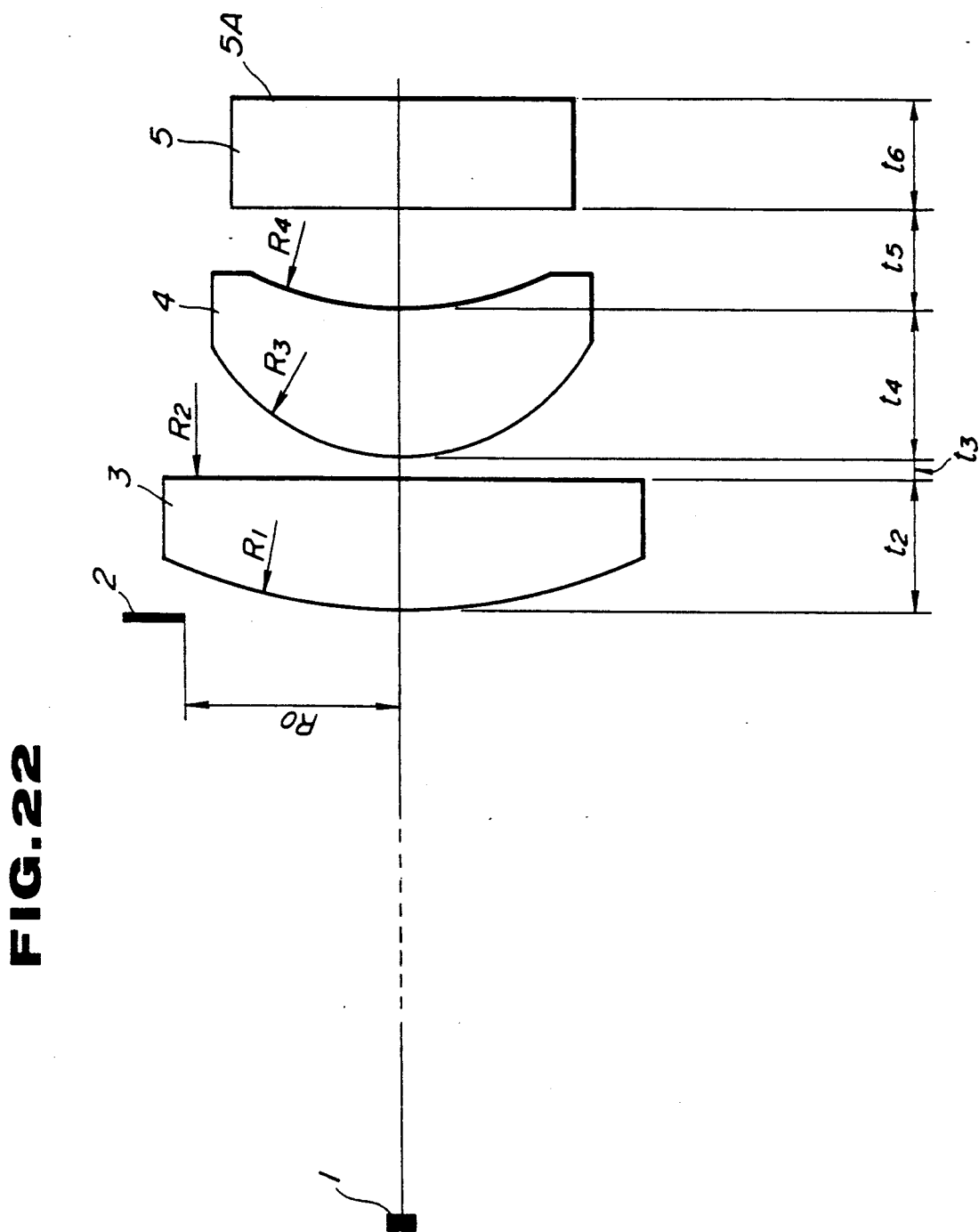
Figure 25:
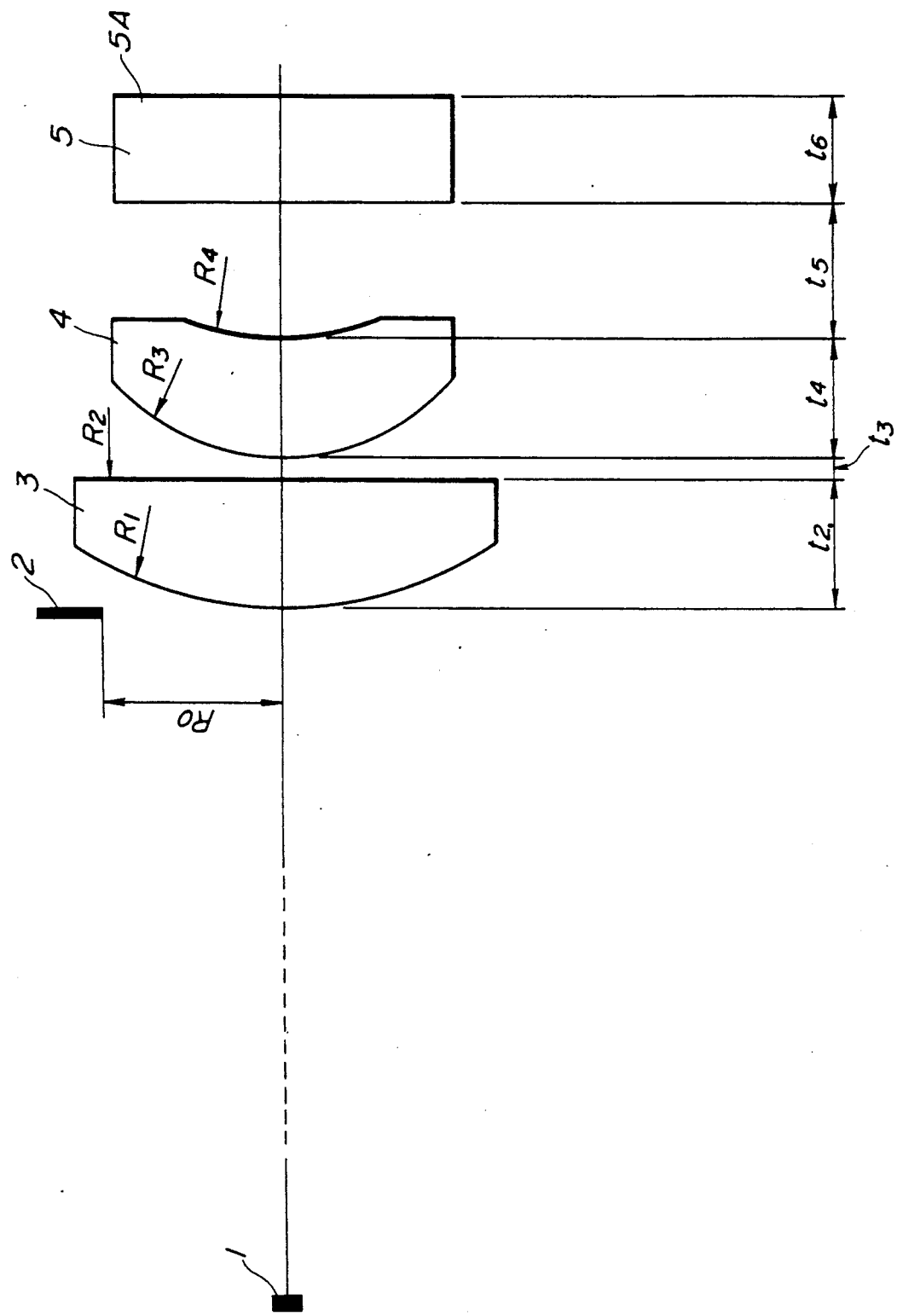
Figure 28:
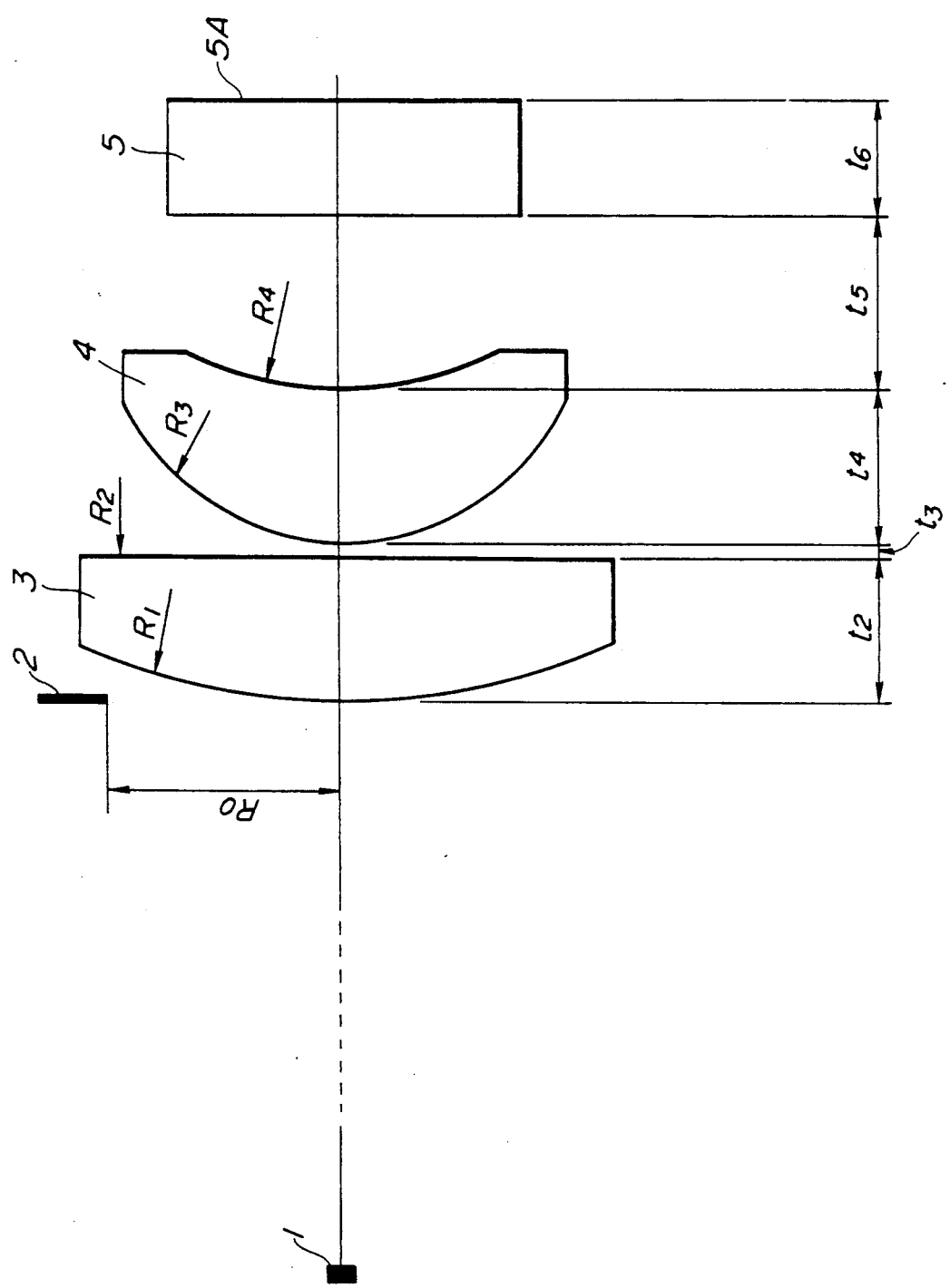

Lens systems according to first through tenth embodiments of the present invention are illustrated respectively in FIGS. 1, 4, 7, 10, 13, 16, 19, 22, 25, and 28. In each of these embodiments, light rays emitted from a light source 1 pass through an aperture stop 2, a lens 3 closer to the light source 1, and a lens 4 closer to an image, and are focused on a recording surface 5A of an information recording medium 5 such as an optical disk or the like. The illustrated position of the aperture stop 2 in each of the embodiments is by way of example only, and the aperture stop 2 may be located in other positions.

The following Table 1 shows the distances between the light source 1, the lens 3, the lens 4, and the information recording medium 5, and the thicknesses on the optical axis of the lenses 3, 4 and the information recording medium 5.

TABLE 1

| Embodiment | $t_1$ | $t_2$ | $t_3$ | $t_4$ | $t_5$ | $t_6$ |
| --- | --- | --- | --- | --- | --- | --- |
| 1 | 13.182 | 1.400 | 1.465 | 2.294 | 1.499 | 1.230 |
| 2 | 13.182 | 1.400 | 2.743 | 2.067 | 1.498 | 1.230 |
| 3 | ∞ | 1.150 | 0.029 | 0.910 | 1.802 | 1.230 |
| 4 | ∞ | 1.150 | 0.447 | 0.802 | 1.799 | 1.230 |
| 5 | ∞ | 1.300 | 0.003 | 0.911 | 1.600 | 1.230 |
| 6 | ∞ | 1.500 | 0.150 | 1.650 | 1.660 | 1.200 |
| 7 | ∞ | 1.500 | 0.100 | 1.653 | 1.610 | 1.200 |
| 8 | ∞ | 1.450 | 0.200 | 1.785 | 1.059 | 1.200 |
| 9 | ∞ | 1.460 | 0.233 | 1.401 | 1.503 | 1.200 |
| 10 | ∞ | 1.550 | 0.100 | 1.713 | 1.849 | 1.200 |

In Table 1,
- $t_1$: the distance between the light source 1 and the lens 3 on the optical axis;
- $t_2$: the thickness of the lens 3 on the optical axis;
- $t_3$: the distance between the lenses 3, 4 on the optical axis;
- $t_4$: the thickness of the lens 4 on the optical axis;
- $t_5$: the distance between the lens 4 and the information recording medium 5 on the optical axis; and
- $t_6$: the thickness of the information recording medium 5 on the optical axis.

These distances and thicknesses are indicated in mm.

The value $\infty$ of the distance $t_1$ indicates that the light rays applied to the lens 3 are parallel. The lens systems with the value=of the distance $t_1$ are so-called a focal lenses which require a collimator lens for making light rays from the light source parallel. The values of $t_2$ indicates the values of $Z_o$.

The radii of the aperture stops 2 and the radii of curvature of the lens surfaces in the above embodiments are given in the following Table 2:

TABLE 2

| Embodiment | $R_0$ | $R_1$ | $R_2$ | $R_3$ | $R_4$ |
|---|---|---|---|---|---|
| 1 | 2.000 | $\infty$ | −5.556 | 3.196 | 12.176 |
| 2 | 2.000 | $\infty$ | −5.555 | 3.521 | $\infty$ |
| 3 | 2.000 | 5.688 | $\infty$ | 2.484 | 4.584 |
| 4 | 2.000 | 6.556 | $\infty$ | 2.474 | 5.554 |
| 5 | 2.000 | 4.545 | $\infty$ | 3.407 | $\infty$ |
| 6 | 2.5 | 7.132 | $\infty$ | 2.839 | 4.566 |
| 7 | 2.5 | 7.098 | $\infty$ | 2.806 | 4.544 |
| 8 | 2.5 | 7.345 | $\infty$ | 2.504 | 4.093 |
| 9 | 2.0 | 4.715 | $\infty$ | 2.613 | 3.574 |
| 10 | 2.5 | 7.461 | $\infty$ | 2.782 | 4.508 |

In Table 2,
- $R_0$: the radius of the aperture stop 2;
- $R_1$: the radius of curvature of the surface of the lens 3 which faces the light source;
- $R_2$: the radius of curvature of the surface of the lens 3 which faces the image;
- $R_3$: the radius of curvature of the surface of the lens 4 which faces the light source; and
- $R_4$: the radius of curvature of the surface of the lens 4 which faces the image.

These radii are indicated in mm.

The constants $n_o$, k in the equation (1) representing the refractive index distribution of the lens 3, the range $Z_s$ or $Z_{eff}$ along the optical axis which requires the refractive index distribution, and the refractive index $n_1$ and the value of $k.Z_{eff}$ in the range $Z_s \leq Z$, for the embodiments are given in the following Tables 3a and 3b:

TABLE 3a

| Embodiment | $n_0$ | k | $Z_s$ | $n_1$ |
|---|---|---|---|---|
| 1 | 1.699120 | 0.2478 | 0.400 | 1.60000 |
| 2 | 1.715040 | 0.2876 | 0.400 | 1.60000 |
| 3 | 1.615000 | 0.057143 | 0.350 | 1.595000 |
| 4 | 1.635000 | 0.114286 | 0.350 | 1.595000 |
| 5 | 1.728419 | 0.228114 | 0.500 | 1.614362 |

TABLE 3b

| Embodiment | $n_0$ | k | $Z_{eff}$ | $k \cdot Z_{eff}$ |
|---|---|---|---|---|
| 6 | 1.63408 | 0.06582 | 0.453 | 0.02982 |
| 7 | 1.63583 | 0.07045 | 0.455 | 0.03205 |
| 8 | 1.70000 | 0.094275 | 0.439 | 0.0414 |
| 9 | 1.53000 | 0.038 | 0.445 | 0.0169 |
| 10 | 1.75000 | 0.069858 | 0.431 | 0.0301 |

In Tables 3a and 3b, $n_o$ and $n_1$ are dimensionless, the values of k are indicated in mm$^{-1}$, and the values of $Z_s$, $Z_{eff}$ are indicated in mm.

The refractive index $n_3$ of the lens 4, the refractive index $n_5$ of the information recording medium 5, and the numerical aperture (NA) on the image side in the embodiments are given in the following Table 4:

TABLE 4

| Embodiment | $n_3$ | $n_5$ | NA |
|---|---|---|---|
| 1 | 1.780000 | 1.53 | 0.50 |
| 2 | 1.775367 | 1.53 | 0.50 |
| 3 | 1.780000 | 1.53 | 0.55 |
| 4 | 1.779417 | 1.53 | 0.55 |
| 5 | 1.506396 | 1.53 | 0.55 |
| 6 | 1.79883 | 1.51509 | 0.60 |
| 7 | 1.79883 | 1.51509 | 0.611 |
| 8 | 1.79883 | 1.51509 | 0.70 |
| 9 | 1.79883 | 1.51509 | 0.50 |
| 10 | 1.61656 | 1.51509 | 0.55 |

Figure 2:
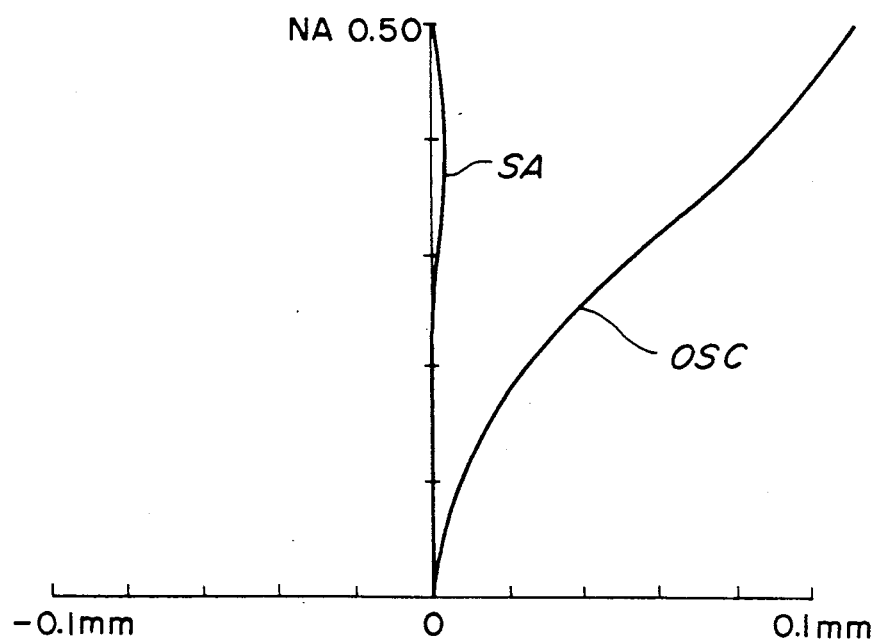
FIGS. 2, 5, 8, 11, 14, 17, 20, 23, 26, and 29 are graphs showing the spherical aberrations (SA) and the offenses against the side condition (OSC) of the lens systems of the first through tenth embodiments.
Figure 3:
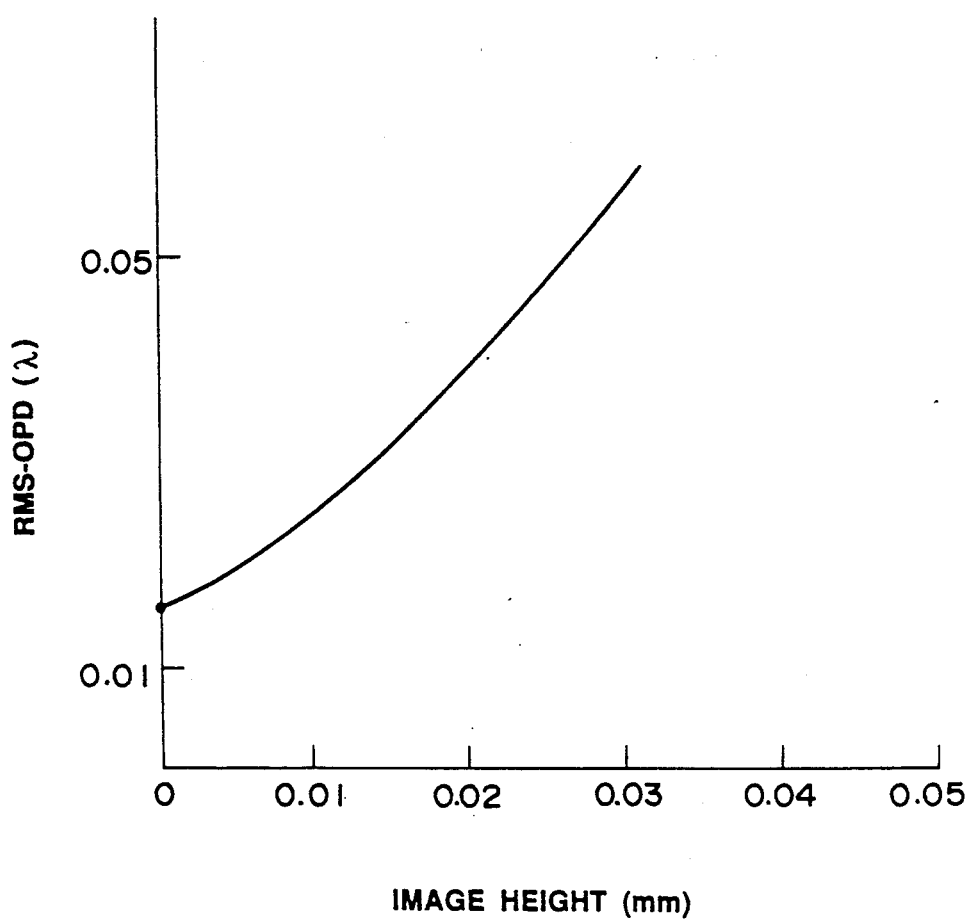
FIGS. 3, 6, 9, 12, and 15 are graphs illustrating wavefront aberrations (RMS-OPD) with respect to image heights of the lens systems of the first through fifth embodiments.
Figure 5:
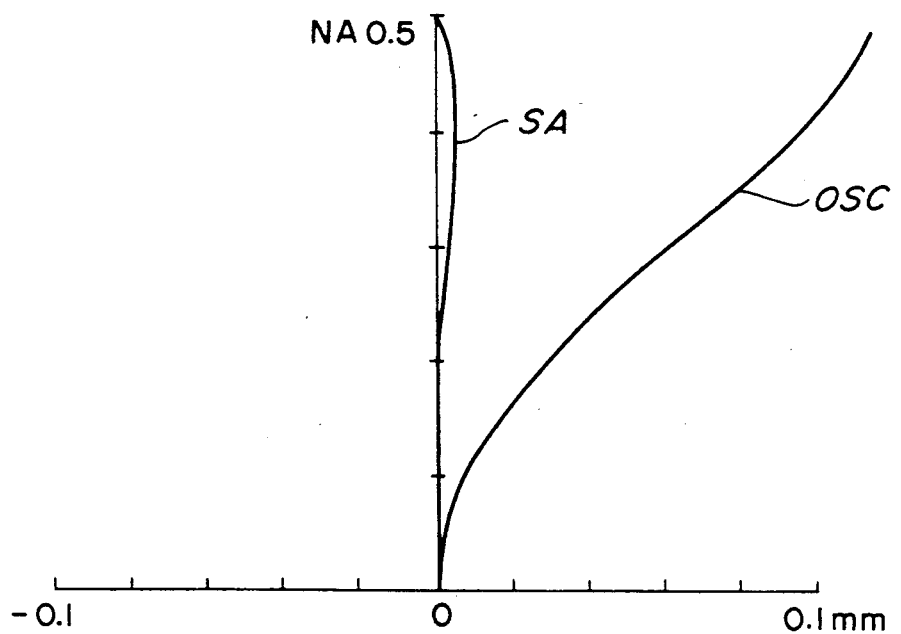
Figure 6:
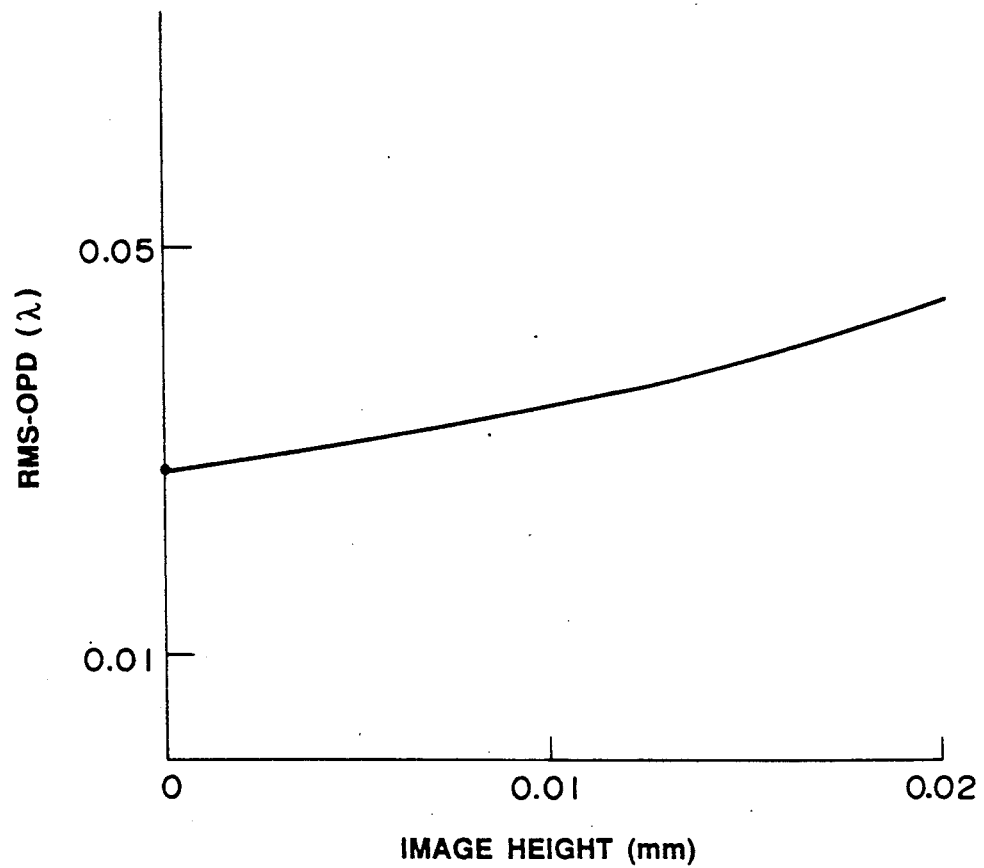
Figure 8:
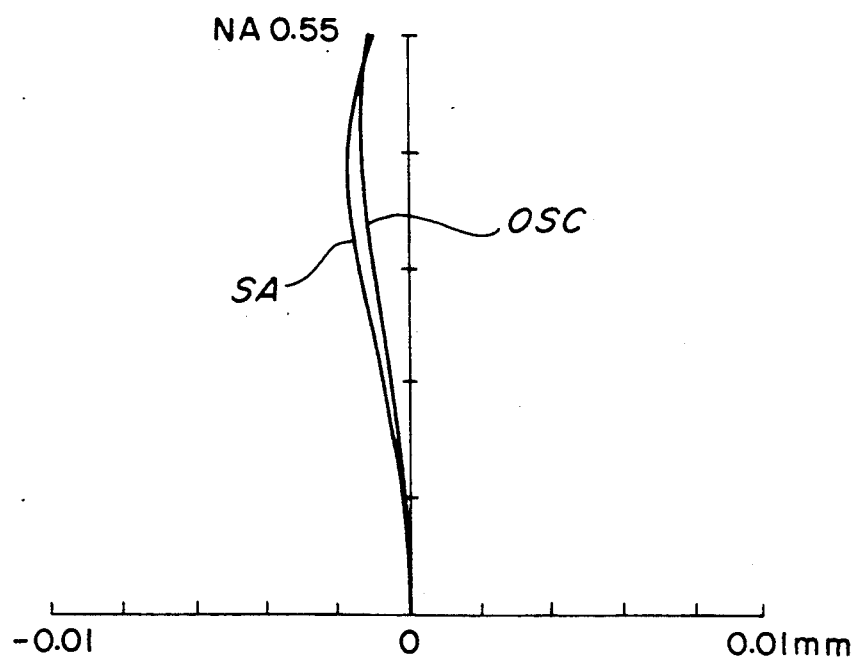
Figure 9:
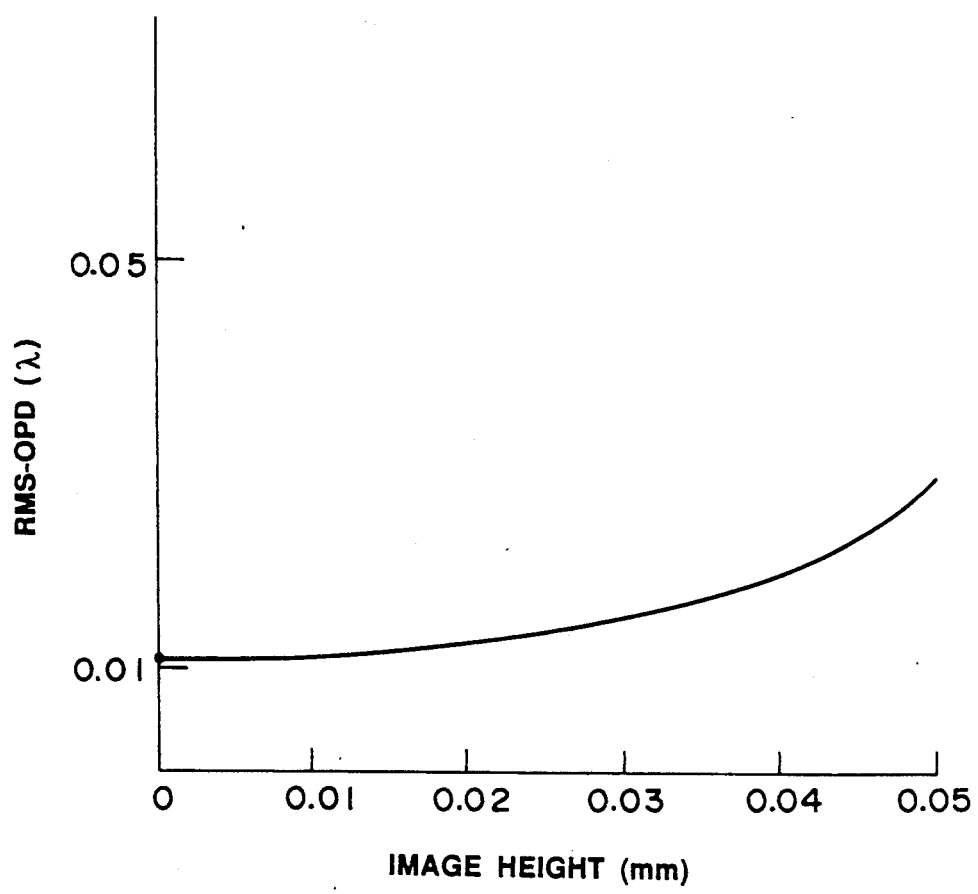
Figure 11:
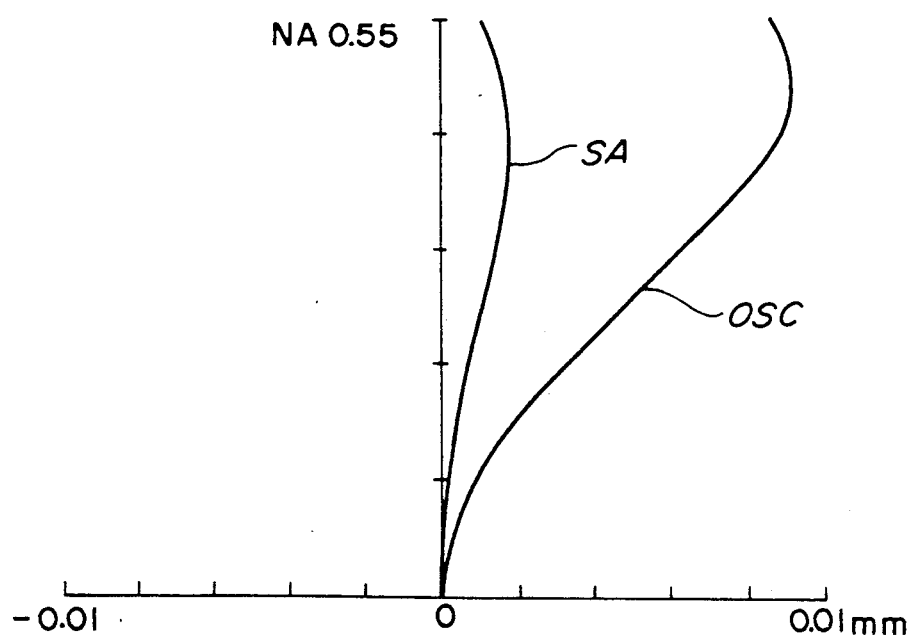
Figure 12:
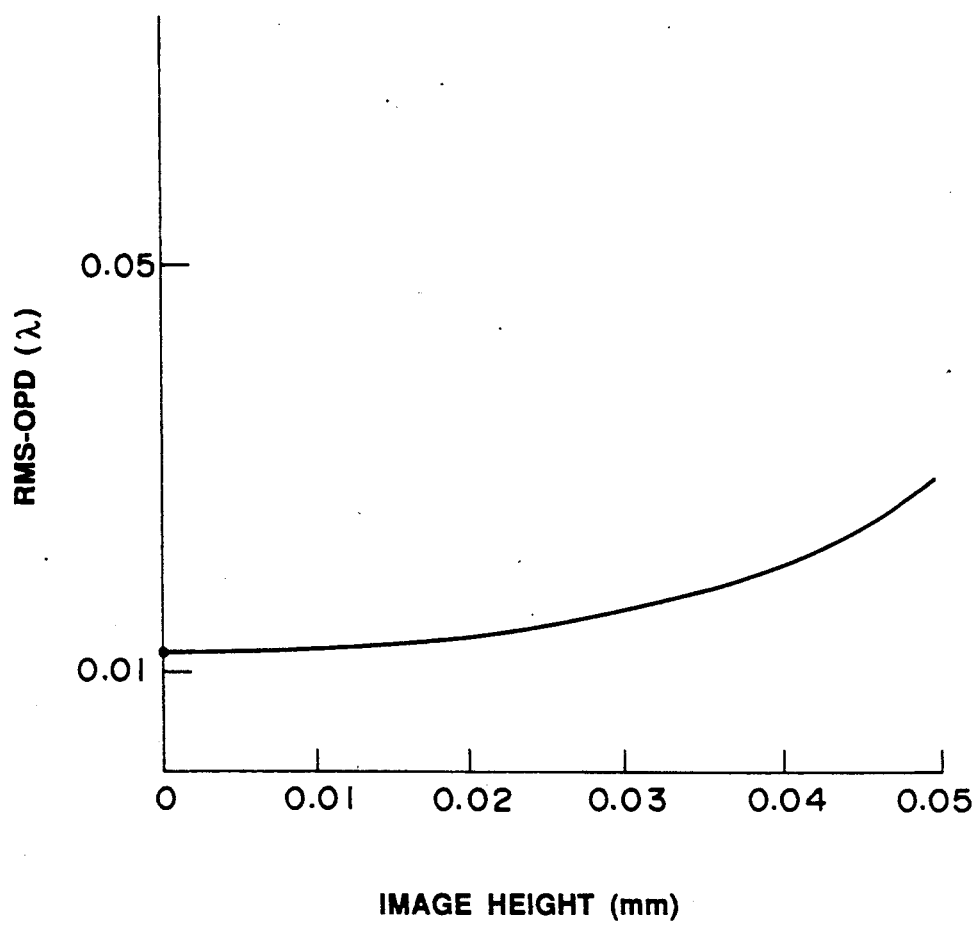
Figure 14:
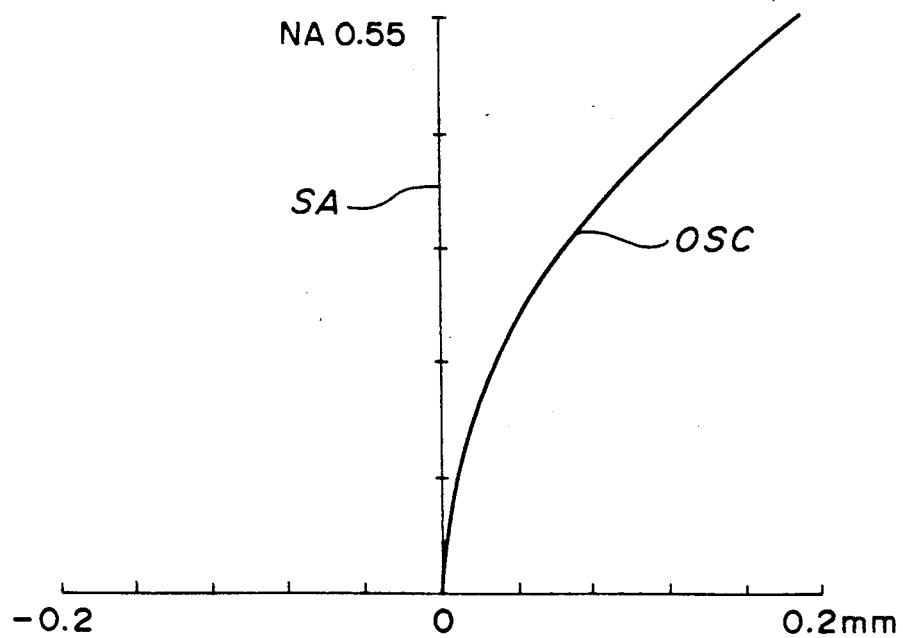
Figure 15:
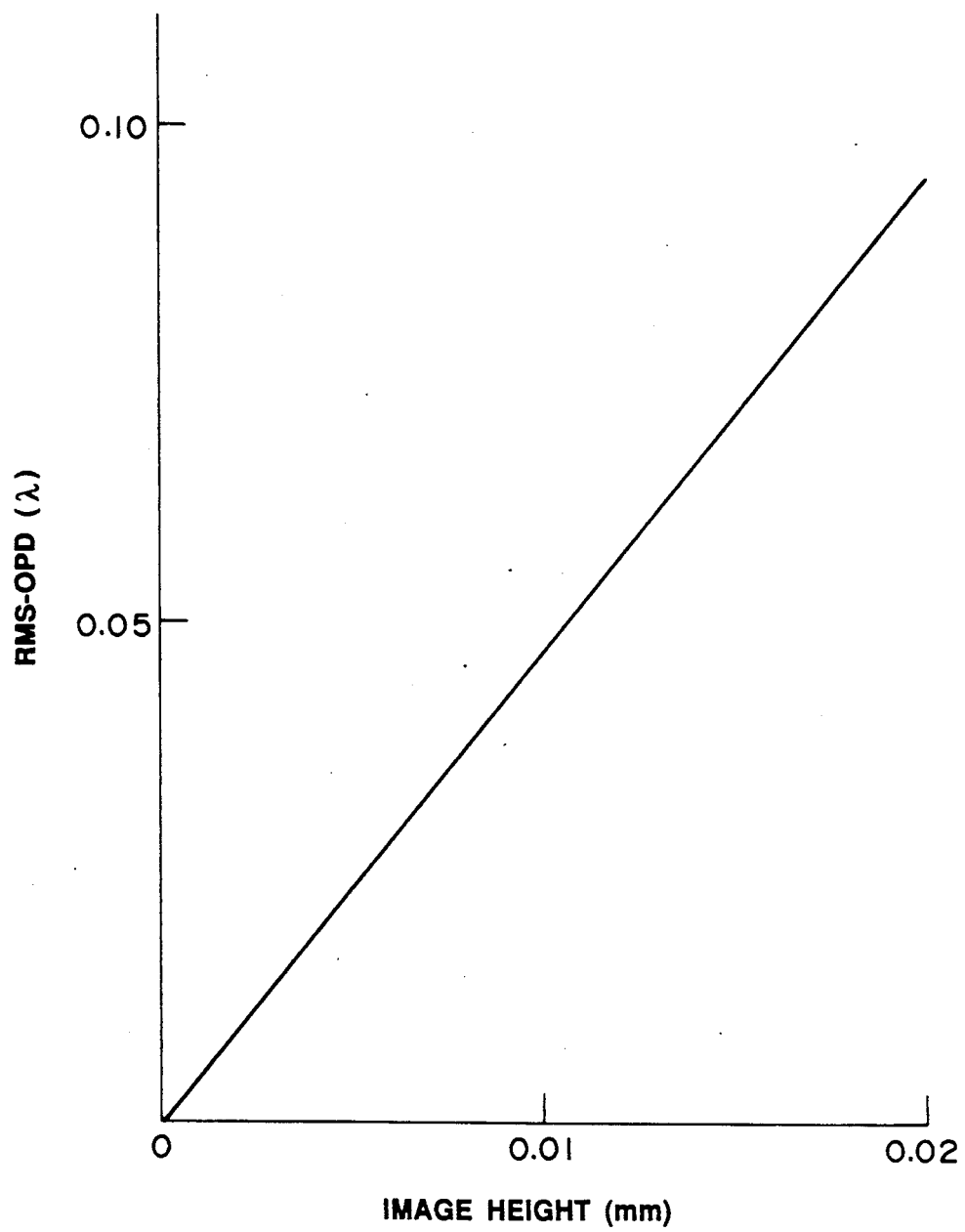
Figure 17:
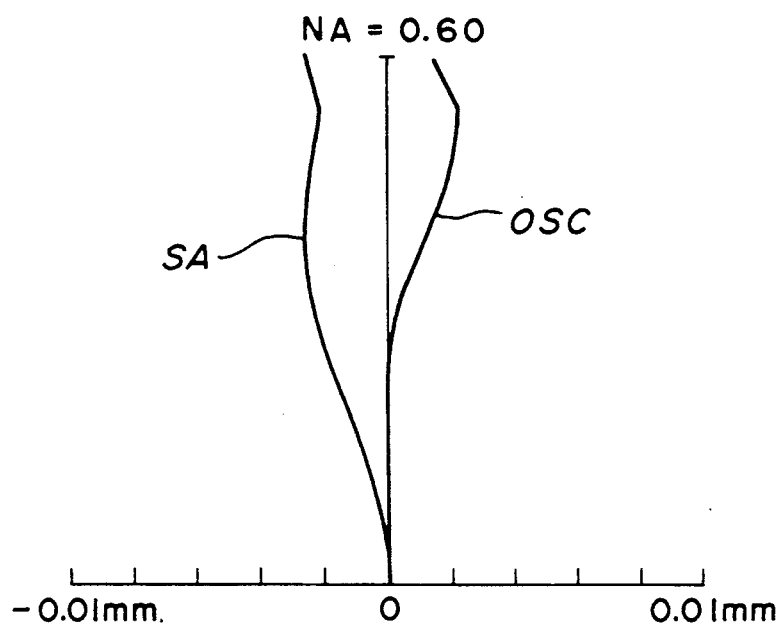
Figure 18:
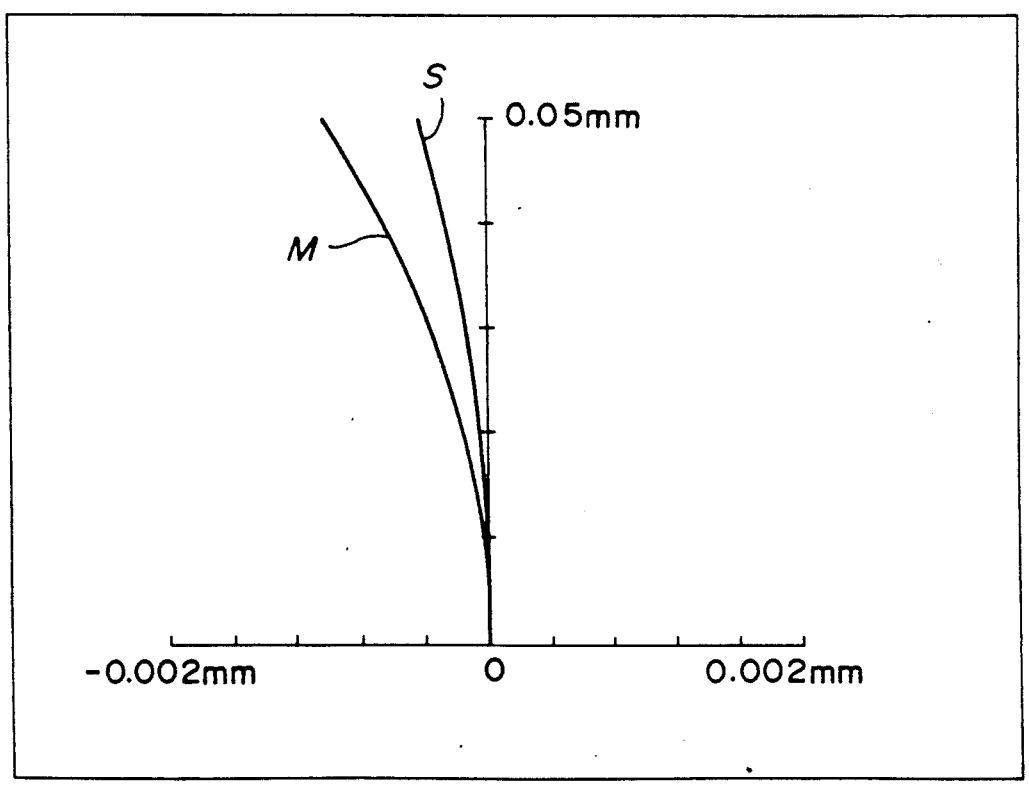
FIGS. 18, 21, 24, 27, and 30 are graphs showing the curvatures of field of the lens systems of the fifth through tenth embodiments.
Figure 20:
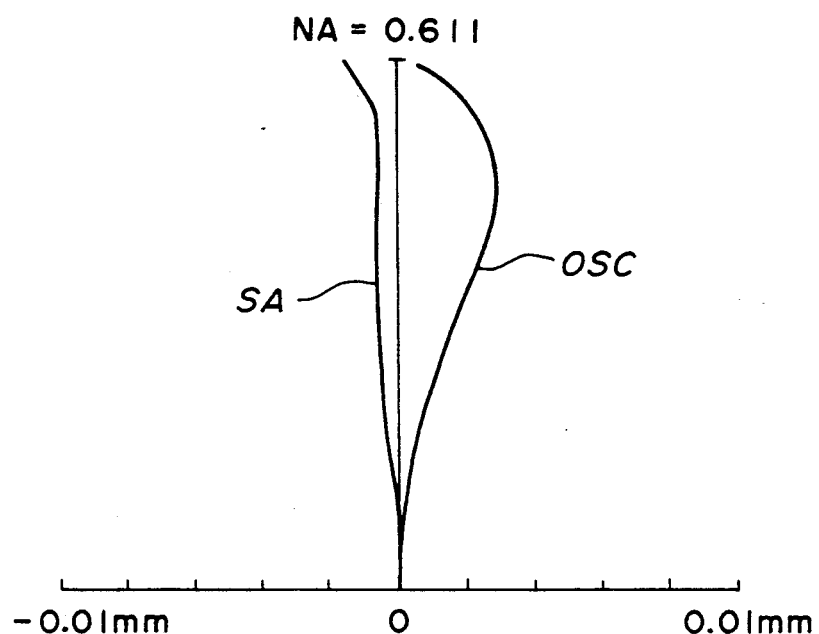
Figure 21:
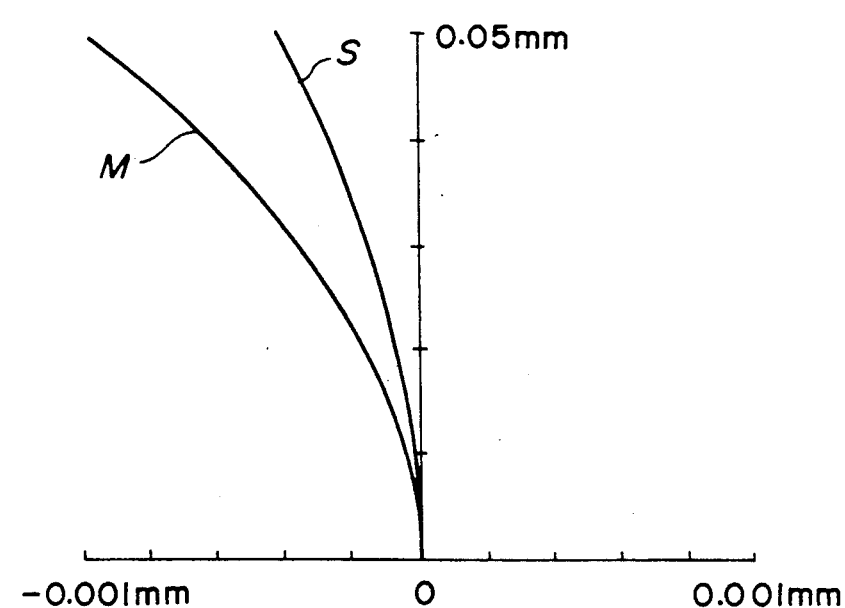
Figure 23:
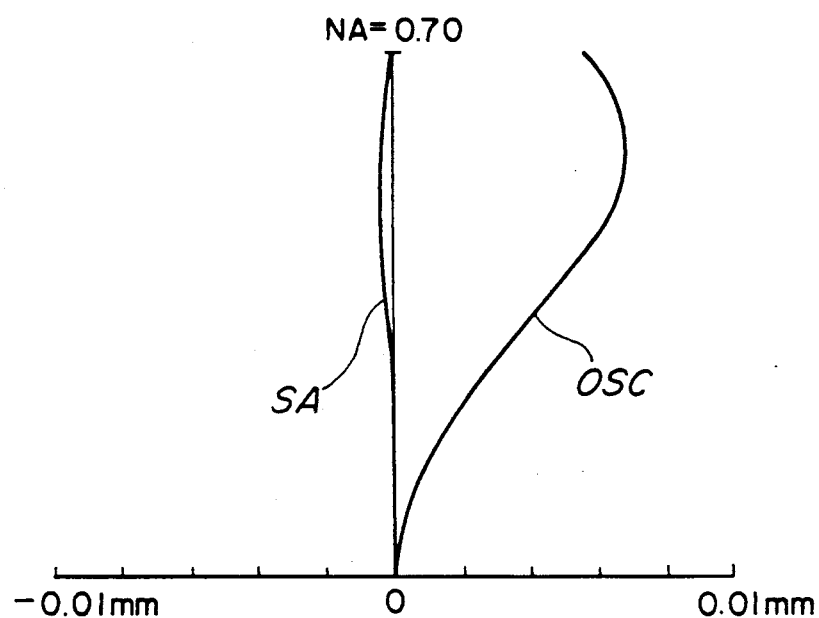
Figure 24:
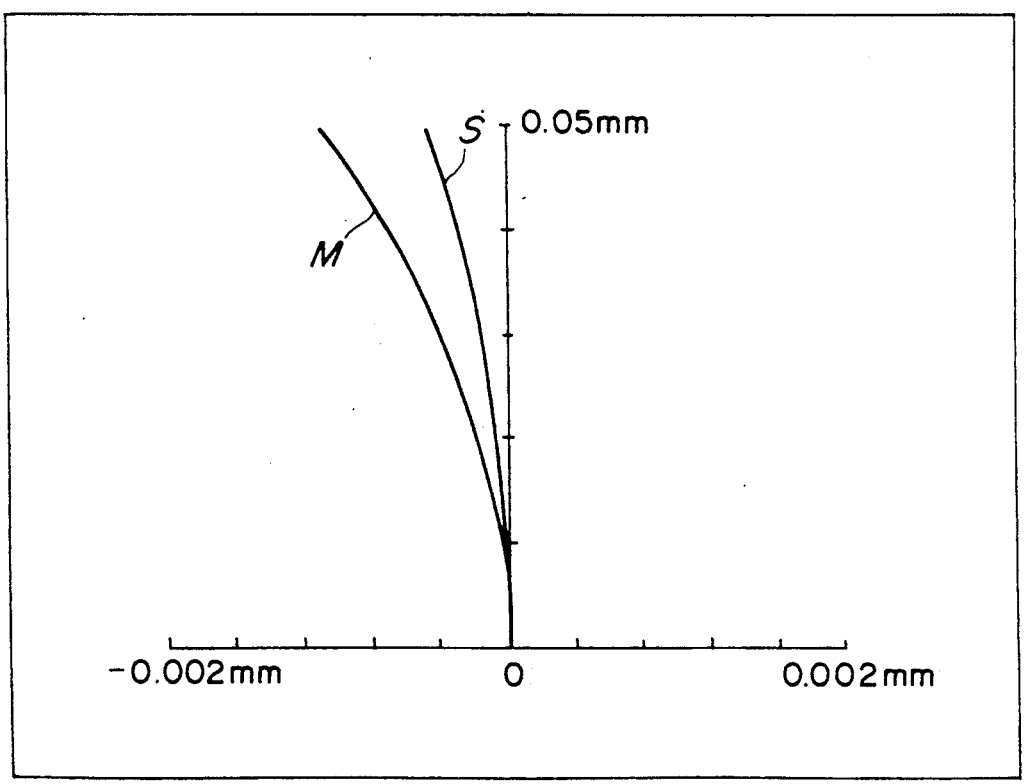
Figure 26:
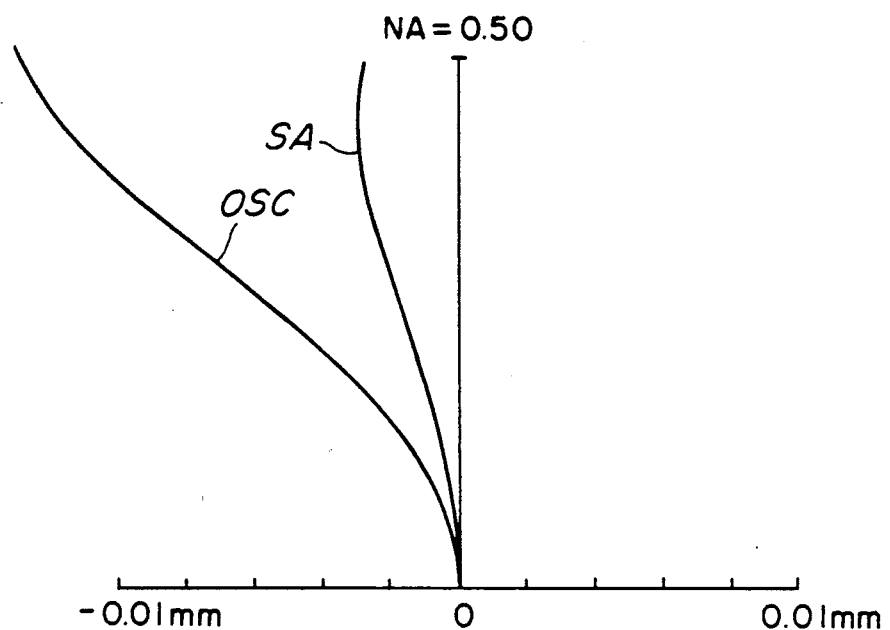
Figure 27:
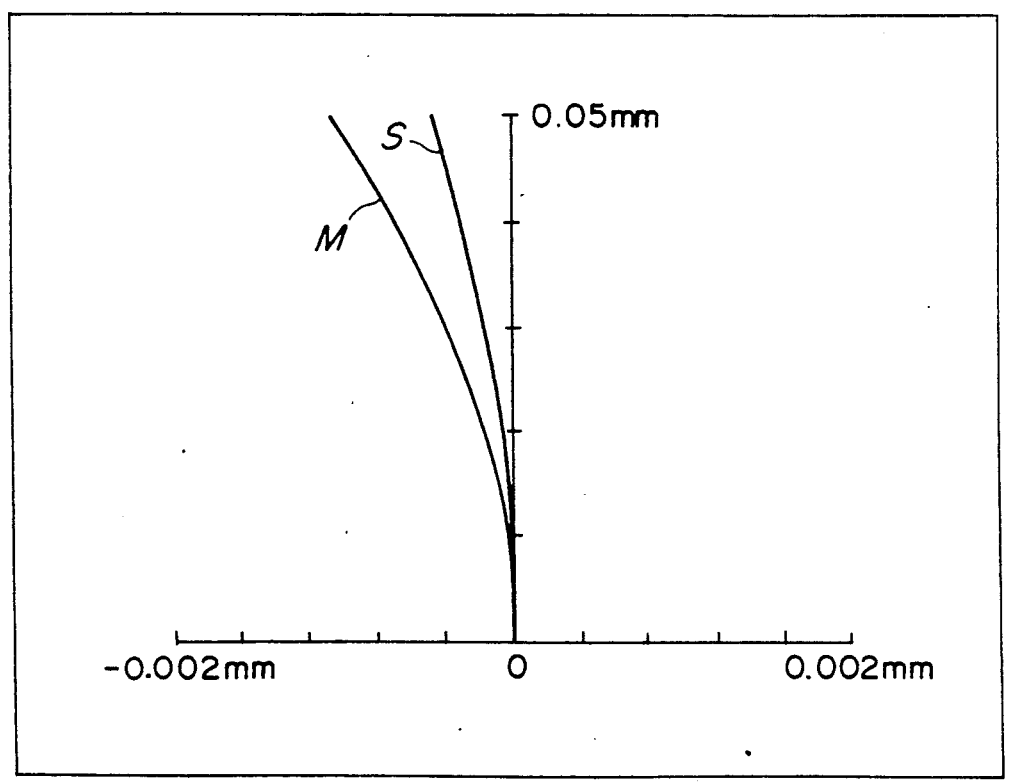
Figure 29:
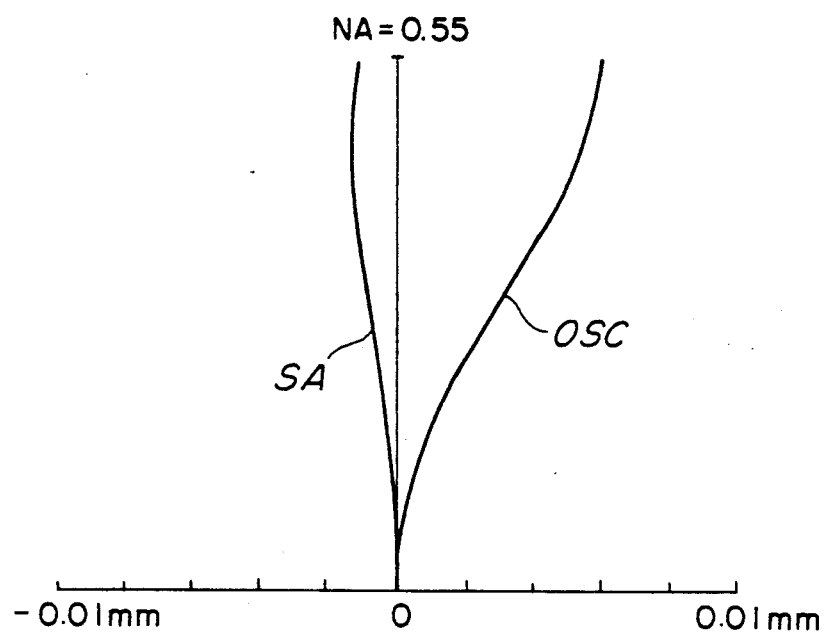
Figure 30:
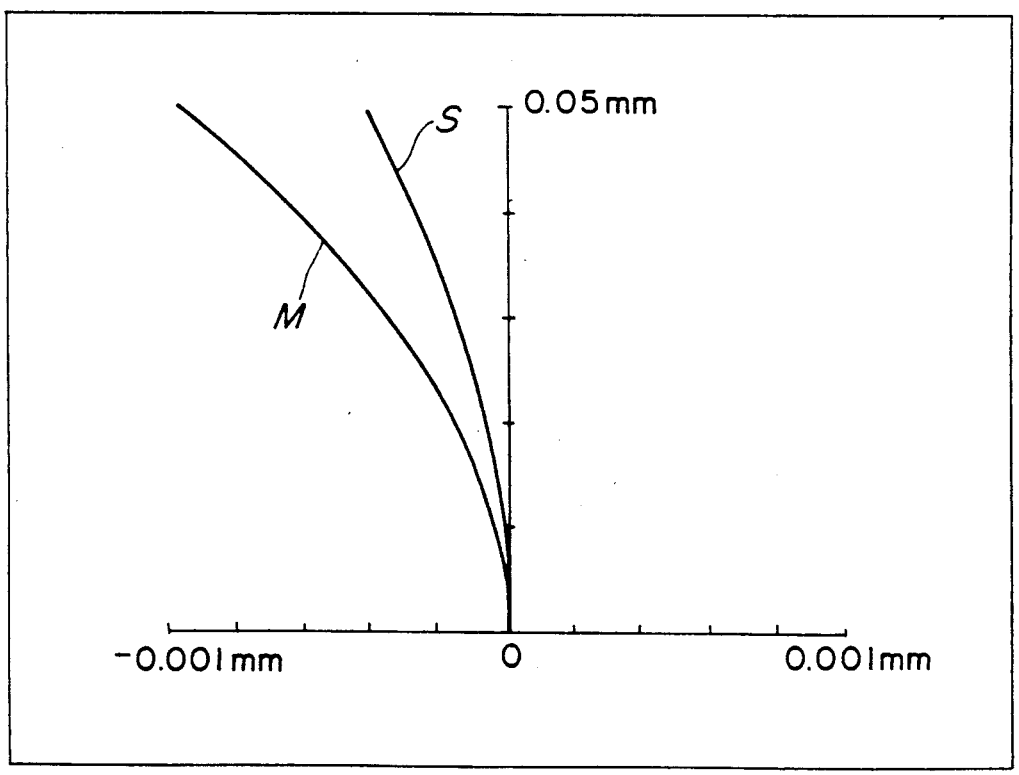
Figure 31:
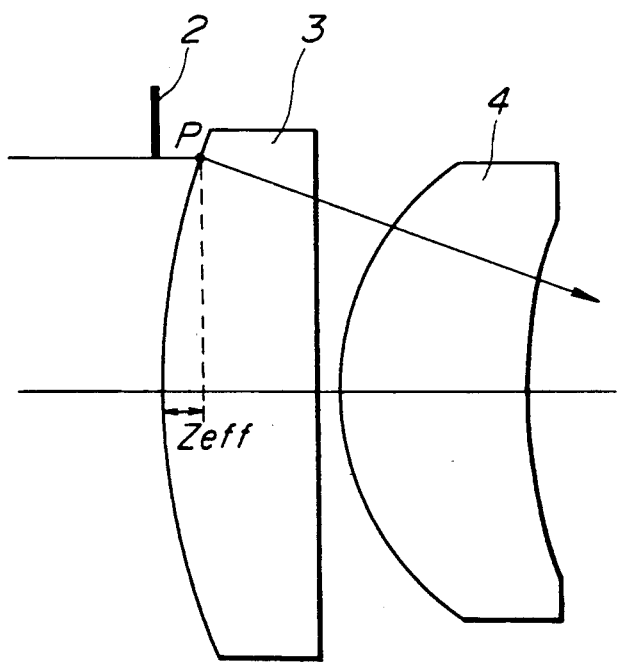
FIG. 31 is a schematic view showing a minimum distance $Z_{eff}$ required for a refractive index distribution in a lens closer to a light source.

Calculated values of spherical aberration (SA) and offense against the sine condition (OSC) in the first through tenth embodiments are shown in FIGS. 2, 5, 8, 11, 14, 17, 20, 23, 26, and 29, respectively. Calculated values of wavefront aberration (RMS-OPD) at the wavelength of 780 mm) with respect to image height in the first through fifth embodiments are illustrated in FIGS. 3, 6, 9, 12, and 15, respectively. Meridional curvatures of field (M) and sagittal curvatures of field (S) in the sixth through tenth embodiments are shown in FIGS. 18, 21, 24, 27, and 30, respectively.

In the sixth through tenth embodiments, the material of the information recording medium 5 is optical glass (BK7) with $n_d = 1.51633$ and $v_d = 64.1$. For designing purpose, the wavelength of light applied to the lens systems is 632.8 nm, and Z is indicated in mm.

In the sixth embodiment, the refractive index distribution $n(Z)$ of the lens 3 can be approximated by:

$$n(Z) = 1.63408 - 0.05536Z - 0.0500Z^2 + 0.04737Z^3 + 0.02654Z^4$$

in the range of $0 \leq Z \leq 0.77$, by:

$$n(Z) = 1.59276$$

in the range of $0.77 < Z < 1.33$, and by $$n(Z) = 1.59276 - 0.00038.(Z-1.33) + 0.15385.(Z-1.33)^2 - 0.12912.(Z-1.33)^3 + 0.02654.(Z-1.33)^4$$

in the range of $1.33 \leq Z \leq 1.50$.

In the seventh embodiment, the refractive index distribution $n(Z)$ of the lens 3 can be approximated by:

$$n(Z) = 1.63583 - 0.06852Z - 0.01326Z^2 + 0.00530Z^3 + 0.05524Z^4$$

in the range of $0 \leq Z \leq 0.75$, by:

$$n(Z) = 1.59222$$

in the range of $0.75 \leq Z \leq 1.35$, and by $$n(Z) = 1.59222 - 0.00415(Z-1.35) + 0.16124(Z-1.35)^2 - 0.16042.(Z-1.35)^3 + 0.05524(Z-1.35)^4$$

in the range of $1.35 \leq Z \leq 1.50$.

In the eighth embodiment, the refractive index distribution n(Z) of the lens 3 can be approximated by:

$$n(Z) = 1.70000 - 0.094275Z$$

in the range of $0 \leq Z \leq 0.45$ and by:

$$n(Z) = 1.65758$$

in the range of $0.45 \leq Z \leq 1.45$.

In the ninth embodiment, the refractive index distribution n(Z) of the lens 3 can be approximated by:

$$n(Z) = 1.53000 - 0.038Z$$

in the range of $0 \leq Z \leq 0.46$ and by:

$$n(Z) = 1.51252$$

in the range of $0.46 < Z \leq 1.46$.

In the tenth embodiment, the refractive index distribution n(Z) of the lens 3 can be approximated by:

$$n(Z) = 1.75000 - 0.069858Z$$

in the range of $0 \leq Z \leq 0.45$, and by:

$$n(Z) = 1.71856$$

in the range of $0.45 < Z \leq 1.55$.

The paraxial focal length f of the entire lens system, the paraxial focal length $f_1$ of the lens 3, and the paraxial focal length $f_2$ in each of the sixth through tenth embodiments are given in the following Table 5:

TABLE 5

| Embodiment | f (mm) | $f_1$ (mm) | $f_2$ (mm) | $f_2/f$ |
|---|---|---|---|---|
| 6 | 4.165 | 11.248 | 6.597 | 1.584 |
| 7 | 4.089 | 11.164 | 6.455 | 1.579 |
| 8 | 3.566 | 10.493 | 5.387 | 1.511 |
| 9 | 4.013 | 8.897 | 7.383 | 1.840 |
| 10 | 4.539 | 9.948 | 8.550 | 1.884 |

According to the present invention, as can be understood from the above embodiments thereof, a bright two-group, two-element lens system is provided which has an NA of 0.50 or higher. The lens system of the invention is small in size, light in weight, and inexpensive to manufacture since it has fewer lenses than conventional lens systems having lenses made of a homogeneous medium.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

I claim:

1. A lens system for focusing a light beam from a light source on an information recording medium, comprising:
a first lens disposed between said light source and said recording medium and having a flat surface which is symmetric with respect to an optical axis thereof and a convex surface which is symmetric with respect to the optical axis, said first lens having a refractive index varying along the optical axis; and
a second lens disposed between said first lens and said recording medium and having a spherically convex surface on the side of entry of the light beam, said second lens having a positive refracting power as a whole and having a uniform refractive index.

2. A lens system according to claim 1, wherein, in the range of:

$$0 \leq Z \leq Z_s \leq Z_o$$

where
Z is a distance along the optical axis in a positive direction toward said flat surface of said first lens from an origin where said convex surface of said first lens and the optical axis intersects, $Z_s$ is a positive constant, and $Z_o$ is the thickness of said first lens on the optical axis,
the refractive index n(Z) of said first lens at the distance Z varies meeting the following conditions:

$$(n_o - kZ) - 0.005 \leq n(Z) \leq (n_o - kz) + 0.005$$

where k is a positive constant, and $n_o$ is a refractive index when Z is zero.

3. A lens system according to claim 2, wherein the ratio of said constant $Z_s$ to the thickness $Z_o$ of said first lens on said optical axis is in the range of:

$$0.001 \leq Z_s/Z_o$$

4. A lens system according to claim 3, wherein the product of said constant k and said constant $Z_s$ is in the range of:

$$0.001 \leq k \cdot Z_s \leq 0.2$$

5. A lens system according to claim 2, wherein said first lens comprises a planoconvex lens with said convex surface being spherically convex on the side of entry of the light beam, and with said flat surface on the side of exit of the light beam, and wherein said second lens comprises a meniscus lens having a spherically concave surface on the side of exit of the light beam.

6. A lens system according to claim 5, wherein said constant $Z_s$ is equal to the value $Z_{eff}$ which is the distance Z of a point P where a light beam emitted from a point on said optical axis and passing through the outermost edge of an entrance pupil of the lens system intersects with the convex surface of said first lens, and wherein the value of said k, said $n_o$, said n(Z) and said $Z_o$ further meet the following conditions:

$$1.53 \leq n_o \leq 1.75 \quad (1)$$

$$0.01 \leq k \cdot Z_{eff} \leq 0.08 \quad (2)$$

$$1.45 \leq n(Z) \leq 1.80$$
in the range of $Z_{eff} < Z \leq Z_o \quad (3)$ $$1.45 \leq n_3 \quad (4)$$

$$f_2/f \leq 3 \quad (5)$$

where
f : the paraxial focal length of the lens system,
$f_2$: the paraxial focal length of said second lens, and
$n_3$: the refractive index of said second lens.

7. An optical system for reproduction of data from a recorded pattern comprising:
  means providing a collimated light beam along an optical path;
  first refractive lens means disposed along the optical path of the collimated light beam, the first refractive lens means having a varying index of refraction along at least a portion of the thickness from the side of entry of the beam, the rate of change of the index of refraction being selected to reduce spherical aberration, and
  second refractive lens means disposed along the optical path to increase the numerical aperture of the optical system.

8. A system as set forth in claim 7 above, wherein the first lens means has a flat surface on the side of entry of the light beam and a convex surface on the side of exit, and wherein the index of refraction increases in the direction of the light beam uniformly throughout the area of the first lens means.

9. A system as set forth in claim 8 above, wherein the refractive index difference in the first lens means is $k \cdot Z_s'$ with k being a positive constant and $Z_s$ being the distance along the optical path of the portion having an increasing index of refraction, the product $k\sqrt{Z_s}$ being between 0.001 and 0.2.

10. A system as set forth in claim 9 above, wherein the refractive index $n_o$ of the vertex of the convex surface is in the range of 1.50 and 1.75 and the value of $n_o - k \cdot Z_s$ is 1.45 or higher.

11. A system as set forth in claim 10 above, wherein the first lens means has a curved first surface on the side of entry of the light beam, and a flat surface of the side of exit, the refractive index distribution of the first lens means along the optical path being curved in accordance with the curved first surface.

12. A system as set forth in claim 11 above, wherein the product $k \cdot Z_{eff}$, with k being a positive constant and $Z_{eff}$ being the distance in millimeters from the point of entry, is between about 0.01 and 0.08.

13. A system as set forth in claim 12 above, wherein the index of refraction $n_o$ at the curved surface is in the range of about 1.55 to about 1.75 and the value n (Z) is in the range of about 1.45 to about 1.80.

* * * * *

UNITED STATES PATENT AND TRADEMARK OFFICE
CERTIFICATE OF CORRECTION

PATENT NO. : 5,050,970
DATED : September 24, 1991
INVENTOR(S) : Shigeo Kittaka

It is certified that error appears in the above-identified patent and that said Letters Patent is hereby corrected as shown below:

Column 1, line 23, insert --.-- after the word "tracking".
Column 2, line 61, "k.$Z_S$." should read --k·$Z_S$.-- (listed twice).
Column 2, line 63, "k.$Z_S$" should read --k·$Z_S$--.
Column 2, line 65, "k.$Z_S$" should read --k·$Z_S$--.
Column 2, line 66, "k.$Z_S$" should read --k·$Z_S$-- (listed twice).
Column 3, line 2, "k.$Z_S$" should read --k·$Z_S$--.
Column 3, line 18, "K.Zeff" should read --K.Zeff--.
Column 3, line 20, "k.Zeff" should read --k·Zeff--.
Column 3, line 59, "n," should read --$n_3$--.
Column 3, line 61, "n," should read --$n_3$--.
Column 3, line 65, "=" should read --$\leq$--.
Column 5, line 15, "=" should read --OO--.
Column 5, line 15, "a focal" should read --afocal--.

UNITED STATES PATENT AND TRADEMARK OFFICE
CERTIFICATE OF CORRECTION

PATENT NO. : 5,050,970
DATED : September 24, 1991
INVENTOR(S) : Shigeo Kittaka

It is certified that error appears in the above-identified patent and that said Letters Patent is hereby corrected as shown below:

Column 5, line 51, "k.Zeff" should read --k· $Z_{eff}$--.
Column 6, line 31, "780 mm)" should read --780 mm--.
Column 6, line 53, "0.00038." should read --0.00038·--.
Column 6, line 53, "0.15385." should read --0.15385·--.
Column 6, line 54, "0.12912." should read --0.12912·--.

Column 6, line 65, "$\leq$" should read --<-- (both occurrences).
Column 6, line 67, "0.00415 (Z-1.35)" should read --0.00415· (Z-1.35)--.
Column 6, line 67, "0.16124" should read --0.16124·--.
Column 6, line 68, "0.05524" should read --0.05524·--.
Column 7, line 11, "$\leq$" should read --<-- (first occurrence).
Column 8, line 58, insert --(3)-- at the far right margin.
Column 8, line 59, delete "(3)" at the far right margin.

UNITED STATES PATENT AND TRADEMARK OFFICE
CERTIFICATE OF CORRECTION

PATENT NO. : 5,050,970
DATED : September 24, 1991
INVENTOR(S) : Shigeo Kittaka

It is certified that error appears in the above-identified patent and that said Letters Patent is hereby corrected as shown below:

Column 10, line 2, "$k\sqrt{Z_s}$" should read --$k \cdot Z_s$--.
Column 10, line 6, "and" should read --to--.

Signed and Sealed this

Twentieth Day of July, 1993

Attest:

MICHAEL K. KIRK

Attesting Officer     Acting Commissioner of Patents and Trademarks